(12) United States Patent
Luo et al.

(10) Patent No.: US 12,157,107 B1
(45) Date of Patent: Dec. 3, 2024

(54) SULFUR-MOLYBDENUM CLUSTER MODIFIED MOF MATERIAL AND PREPARATION METHOD AND APPLICATION THEREOF

(71) Applicant: Shanghai Jiao Tong University, Shanghai (CN)

(72) Inventors: Jinming Luo, Shanghai (CN); Chunyu Lv, Shanghai (CN); Kaixing Fu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 18/797,446

(22) Filed: Aug. 7, 2024

(30) Foreign Application Priority Data

Jan. 17, 2024 (CN) .................. 202410070648.X

(51) Int. Cl.
| | | |
|---|---|---|
| *B01J 20/22* | (2006.01) | |
| *B01J 20/30* | (2006.01) | |
| *B01J 27/051* | (2006.01) | |
| *C02F 1/28* | (2023.01) | |
| *C02F 101/20* | (2006.01) | |

(52) U.S. Cl.
CPC ........... *B01J 20/226* (2013.01); *B01J 20/223* (2013.01); *B01J 20/3071* (2013.01); *B01J 20/3085* (2013.01); *B01J 27/051* (2013.01); *C02F 1/288* (2013.01); *C02F 2101/20* (2013.01)

(58) Field of Classification Search
CPC .... B01J 20/223; B01J 20/226; B01J 20/3071; B01J 20/3085; B01J 27/051; C02F 1/288; C02F 2101/20
See application file for complete search history.

(56) References Cited

FOREIGN PATENT DOCUMENTS

| | | |
|---|---|---|
| CN | 108607512 A | 10/2018 |
| CN | 110694693 A | 1/2020 |
| CN | 114177923 A | 3/2022 |
| CN | 115646462 A | 1/2023 |

OTHER PUBLICATIONS

Yazdi et al., Journal of Environmental Chemical Engineering, vol. 9, 104696 (2021).*
Mahnaz Nozohour Yazdi et al., "Synthesis of stable S-functionalized metal-organic framework using MoS42- and its application for selective and efficient removal of toxic heavy metal ions in wastewater treatment", Journal of Environmental Chemical Engineering, vol. 9, No. 1, Nov. 3, 2020.
Xiaoping Dai et al., "Molybdenum Polysulfide Anchored on Porous Zr-Metal Organic Framework to Enhance the Performance of Hydrogen Evolution Reaction", The Journal of Physical Chemistry C, vol. 120, May 27, 2016.

* cited by examiner

*Primary Examiner* — John Kim

(57) ABSTRACT

Disclosed are a sulfur-molybdenum cluster modified MOF material and a preparation method and application thereof, and the material is prepared by taking an MOF material as a metal organic framework material, and modifying ammonium tetrathiomolybdate inside the metal organic framework material; and according to the mass percentage, the MOF material accounts for 45 wt % to 90 wt %, and a modification amount of the ammonium tetrathiomolybdate accounts for 10 wt % to 55 wt %. The ammonium tetrathiomolybdate is embedded into an MOF material framework in a solution in a form of an anion $MoS_4^{2-}$ for modification. According to the invention, the MOF material is modified by the ammonium tetrathiomolybdate, and compared with an existing sulfydryl modified composite material, the modified composite material shows a higher adsorption capacity, a higher adsorption rate and a higher S atom effective utilization rate in the application of removing Hg (II) in water, and meets a wider practical application scene.

5 Claims, 12 Drawing Sheets

SULFUR-MOLYBDENUM CLUSTER MODIFIED MOF MATERIAL AND PREPARATION METHOD AND APPLICATION THEREOF

CROSS-REFERENCE TO RELATED APPLICATIONS

This application claims foreign priority of Chinese Patent Application No. 202410070648.X, filed on Jan. 17, 2024 in the China National Intellectual Property Administration, the disclosures of all of which are hereby incorporated by reference.

TECHNICAL FIELD

The present invention relates to the technical field of environmental chemistry, and particularly to a sulfur-molybdenum cluster modified MOF material and a preparation method and application thereof.

BACKGROUND OF THE PRESENT INVENTION

Heavy metal mercury pollution in water is an important link of water pollution. A common existence form of mercury in industrial wastewater and natural environment water is mainly inorganic mercury (Hg(II)), and commonly used removal technologies comprise a coagulant sedimentation method, an ion exchange method, a bio-remediation method, a membrane separation method, an adsorption method, and the like. The adsorption method is the most widely used, practical and effective method for removing the Hg(II) due to simple operation, low cost and high removal efficiency. Traditional adsorbents (such as an activated carbon material, zeolite and a ceramic clay composite material) were widely used in the treatment of various industrial wastewater in the early days. However, these adsorbents have a low adsorption capacity and a slow adsorption rate, and have a limited capability of removing the Hg(II) in complex water, thus being unable to cope with the increasingly complex sewage environment and being difficult to meet the increasingly stringent water quality standard.

A metal-organic frameworks (MOFs) material is a new organic-inorganic hybrid porous material formed by the coordination interaction between metal ions or ionic clusters and organic ligands. In recent years, due to unique physical and chemical properties and excellent adsorption performance of the material, the material has attracted extensive attention in the removal of Hg(II) in water. At present, the research on the adsorption and removal of Hg(II) by the MOFs material mainly focuses on the modification of the material with a sulfhydryl (—SH) functional group, because there is a very high affinity between S and Hg (affinity constant >$10^{16}$ and solubility product constant $Ksp=1.6\times 10^{-52}$). Traditional sulfhydryl modification methods comprise modification after synthesis and modification before synthesis. In 2011, Ke et al. first tried to use the MOFs material to remove the Hg(II) in water, and mixed a sulfydryl-containing organic ligand (dithioethanol, HS—$CH_2$—$CH_2$—SH) with a prepared $[Cu_3(BTC)_2(H_2O)_3]_n$ crystal (HKUST-1) for the modification after synthesis to obtain sulfydryl-rich SH-HKUST-1, and a theoretical adsorption capacity of the modified material for the Hg(II) reached 714.3 mg/g. Based on the synthesis of traditional UiO-66, Ding et al. successfully obtained a sulfhydryl-rich Zr-DMBD material by allowing sulfydryl-containing $H_2DMBD$ to react with $ZrCl_4$ according to the method of modification before synthesis, and a result showed that a theoretical adsorption capacity of the Zr-DMBD material for the Hg(II) was 171.5 mg/g, which was about 8 times higher than that of the UiO-66 material without sulfhydryl modification.

Although the sulfhydryl modified MOFs material shows great application potential in removing the Hg(II), there are still some problems. On one hand, the sulfhydryl in the sulfhydryl modified material is a main site for adsorption of the Hg(II). However, due to the diversity of coordination of the Hg(II) in water environment, the effective combination of the sulfhydryl site and the Hg(II) is easily affected by steric hindrance, electron clouds and the like inside the material, which leads to a low S atom effective utilization rate in the sulfhydryl modified material. On the other hand, because there is only a simple chemical interaction between the Hg(II) and the sulfhydryl, a mass transfer rate is strictly restricted by a concentration of the Hg(II) in the solution, an addition amount of the adsorption material, a reaction temperature and a specific surface area of the adsorption material. In addition, coexisting ions, pH and dissolved organic substances in actual water may also affect an actual adsorption effect of the material, which eventually leads to a low adsorption capacity, a slow adsorption rate and a limited deep removal rate of the modified material, thus greatly affecting the processing efficiency of the material in practical application To sum up, it is urgent to develop a new adsorbent material which can not only ensure the adsorption capacity for the Hg(II), but also effectively improve the utilization efficiency of S atoms in the material and the adsorption rate of the material.

SUMMARY OF THE PRESENT INVENTION

The present invention discloses a sulfur-molybdenum cluster modified MOF material and a preparation method and application thereof, in the composite material, ammonium tetrathiomolybdate is modified on a Zr metal center in an MOF material framework in a form of an ion $MoS_4^{2-}$ cluster and embedded in the MOF material framework for modification, and compared with existing composite materials modified in other forms, the modified composite material has a better adsorption performance, and can have a higher adsorption capacity and a higher adsorption rate in an application in removing Hg(II) in water.

Specific technical solutions are as follows.

The present invention provides a sulfur-molybdenum cluster modified MOF composite material, wherein an MOF material is taken as a metal organic framework, and ammonium tetrathiomolybdate is modified in the metal organic framework; according to a mass percentage of the sulfur-molybdenum cluster modified MOF composite material, the MOF material accounts for 45 wt % to 90 wt %, and a modification amount of the ammonium tetrathiomolybdate accounts for 10 wt % to 55 wt %; and the MOF is UiO-66 or MOF-808.

Preferably, according to the mass percentage of the sulfur-molybdenum cluster modified MOF composite material, the MOF material accounts for 80 wt % to 90 wt %, and the modification amount of the ammonium tetrathiomolybdate accounts for 10 wt % to 20 wt %.

More preferably, the modification amount of the ammonium tetrathiomolybdate accounts for 16.7 wt %, and the MOF material accounts for 83.3 wt %, which means that 20 mg of ammonium tetrathiomolybdate is dissolved in 20 ml of water, and then the solution is added with 100 mg of MOF material; and in the case of this modification amount, the modified MOF material has a highest S atom utilization rate.

Further, the ammonium tetrathiomolybdate is modified on a Zr metal center inside an MOF material in a form of an anion $MoS_4^{2-}$ cluster in a solution.

In the text, a UiO-66-MAA material is a thioglycolic acid modified UiO-66 material; a UiO-66-Mo1 material is an ammonium tetrathiomolybdate modified UiO-66 composite material; a ZIF-8 material is a ZIF series material formed by connecting zinc nitrate with 2-methylimidazole, which is named as ZIF-8-MO1 after being modified by the ammonium tetrathiomolybdate; an HKUST-1 material is a MOF material formed by copper nitrate and terephthalic acid, which is named as HKUST-1-MO1 after being modified by the ammonium tetrathiomolybdate; and an MOF-808 material is a zirconium-based metal-organic framework material, which is named as MOF-808-Mo1 after being modified by the ammonium tetrathiomolybdate.

The present invention further provides a preparation method of the sulfur-molybdenum cluster modified MOF composite material, which comprises the following steps of:
  adding the MOF material into an ammonium tetrathiomolybdate aqueous solution, and mixing and stirring the mixture to obtain a mixed solution; and subjecting the mixed solution to high-temperature reaction, washing and drying the obtained product to prepare the ammonium tetrathiomolybdate modified MOF composite material.

Further, a concentration of the ammonium tetrathiomolybdate aqueous solution is 0.5 g/L to 6 g/L; and a ratio of the MOF material to the ammonium tetrathiomolybdate aqueous solution is 1 g: 0.11 g/L to 1.2 g/L.

The ammonium tetrathiomolybdate material is added into 20 ml of water first, with an addition amount of 10 mg to 120 mg, subjected to ultrasonic dissolution, and then added with fixed 100 mg of MOF material.

Further, the mixing and stirring lasts for 6 hours to 18 hours.

Preferably, the mixing and stirring lasts for 8 hours.

The mixing and stirring refers to magnetic stirring at room temperature after ultrasonic vibration.

Further, the high-temperature reaction is carried out at a temperature of 80° C. to 120° C., and lasts for 2 hours to 24 hours.

Preferably, the high-temperature reaction is carried out at the temperature of 80° C., and lasts for 24 hours.

After the MOF material is added into the ammonium tetrathiomolybdate solution, the glass bottle is directly put into an oven for reaction. However, because the aqueous solution will boil at 120° C., it is necessary to transfer the mixed solution into a polytetrafluoroethylene-lined reactor for reaction.

Further, the freeze-drying is carried out at –60° C. to –40° C., and lasts for 18 hours to 36 hours.

Preferably, the freeze-drying is carried out at –50° C., and lasts for 24 hours.

A preparation process of the UiO-66 material comprises: dissolving zirconium salt and terephthalic acid in N,N-dimethylformamide to form a mixed solution I first, then adding acetic acid and deionized water to form a mixed solution II, subjecting the mixed solution II to high-temperature reaction, cooling and washing the obtained product, and drying the product to prepare the UiO-66 material.

The zirconium salt is zirconium chloride, and a molar concentration ratio of the zirconium salt to the terephthalic acid in the mixed solution I is 1:0.5 to 1:2; a molar ratio of the zirconium salt to the acetic acid is 1:10 to 1:200, and a molar ratio of the zirconium salt to the water is 1:0.5 to 1:2; washing solutions are respectively N,N-dimethylformamide, methanol and deionized water in sequence; the high-temperature reaction is carried out at a temperature of 120° C. to 160° C., and lasts for 24 hours to 72 hours; and the drying refers to freeze drying, and the freeze drying is carried out at a temperature of –60° C. to –40° C., and lasts for 18 hours to 36 hours.

A preparation process of the MOF-808 material comprises: dissolving zirconium salt and trimesic acid in N,N-dimethylformamide to form a mixed solution III first, then adding an acetic acid aqueous solution to form a mixed solution IV, subjecting the mixed solution IV to high-temperature reaction, cooling and washing the obtained product, and drying the product to prepare the MOF-808 material.

The present invention further provides an application of the sulfur-molybdenum cluster modified MOF composite material above, or a sulfur-molybdenum cluster modified MOF composite material prepared by the preparation method above in removing Hg(II) in mercury contaminated water.

Compared with the prior art, the present invention has the following beneficial effects.

(1) According to the present invention, in the ammonium tetrathiomolybdate modified MOF material, the ammonium tetrathiomolybdate is modified on a Zr metal center in an MOF material framework in a form of an ion $MoS_4^{2-}$ cluster, and compared with existing composite materials modified in other forms, the modified composite material has a better adsorption performance, and can have a higher adsorption capacity and a higher adsorption rate for the Hg(II) in an application in removing the Hg(II) in water; and meets an application scenario of more complex water environment.

(2) Compared with a traditional sulfhydryl modification method, a new simple, rapid and efficient post-modification method provided by the present invention has milder reaction conditions, the ammonium tetrathiomolybdate selected in the present invention is an inorganic compound, with a molecular formula of $(NH_4)_2MoS_4$, and an S content in the material per unit mass accounts for 49.2%, which is much higher than a traditional sulfhydryl modified molecule, such as 34.7% of thioglycolic acid and 26.4% of cysteine.

(3) The ammonium tetrathiomolybdate used in the present invention is a water-soluble molecule, which may form a homogeneous solution in an aqueous solution, thus being easily modified inside the material. The ammonium tetrathiomolybdate exists in the form of $MoS_4^{2-}$ in water, the overall structure shows a regular tetrahedron configuration, a volume of an occupied space is small, and after the ammonium tetrathiomolybdate is modified inside the MOF material, on one hand, an original pore structure can be effectively retained inside the material, and on the other hand, a proportion of S atoms in unit volume is high, so that S active sites in the material can be more effectively exposed.

DETAILED DESCRIPTION OF PREFERRED EMBODIMENTS

The present invention is further described hereinafter with reference to specific embodiments, and only the specific embodiments of the present invention are listed below, but the scope of protection of the present invention is not limited to this.

In a case, a ZIF-8 material is a ZIF series material formed by connecting zinc nitrate with 2-methylimidazole, which is named as ZIF-8-Mo1 after being modified by ammonium tetrathiomolybdate; and an HKUST-1 material is a MOF material formed by copper nitrate and terephthalic acid, which is named as HKUST-1-Mo1 after being modified by the ammonium tetrathiomolybdate. The ZIF-8 material and the HKUST-1 material are both commercially available.

Embodiment 1

An ammonium tetrathiomolybdate modified UiO-66 composite material had a specific preparation method as follows.
(1) Preparation of UiO-66: 0.2331 g of zirconium chloride (1 mmol) and 0.1661 g of terephthalic acid (1 mmol) were respectively dissolved in 10 mL of organic solvent N,N-dimethylformamide (DMF) at room temperature, then the solution was mixed and transferred into 50 mL of polytetrafluoroethylene reactor line, added with 2.86 mL (50 mmol) of acetic acid and 20 μL of deionized water, and mixed evenly, and then the reactor was transferred into an oven at 120° C. for reaction for 24 hours. After the reaction was finished, the reaction product was cooled to room temperature, and then subjected to ultrasonic cleaning twice with N,N-dimethylformamide, methanol and deionized water in sequence, and finally, the product was put into a freeze-dryer for freeze-drying at −50° C. for 24 hours, so as to obtain a UiO-66 raw material.
(2) 20 mg of ammonium tetrathiomolybdate was dissolved in 20 mL of deionized water, added with 100 mg of Uio-66 material, subjected to ultrasonic vibration, and then stirred by a magnetic force at room temperature for 8 hours, and then the mixed solution was transferred into an oven at 80° C. for reaction for 24 hours. The obtained sample was subjected to ultrasonic cleaning with deionized water for three times, and finally, the product was put into a freeze-drier for freeze-drying at −50° C. for 24 hours, so as to obtain the ammonium tetrathiomolybdate modified UiO-66 material, which was named as UiO-66-Mo1, wherein a modification amount of the ammonium tetrathiomolybdate accounted for 16.7 wt %.

Figure 1A:
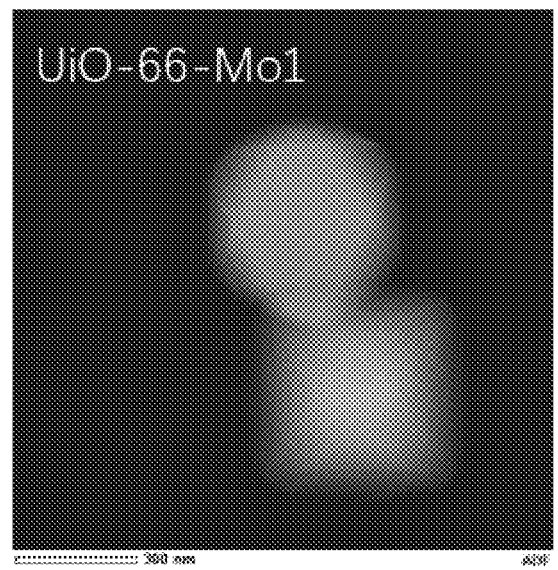
FIG. 1a shows a transmission electron microscope (TEM) image of a UiO-66-Mo1 material in Embodiment 1.
Figure 1B:
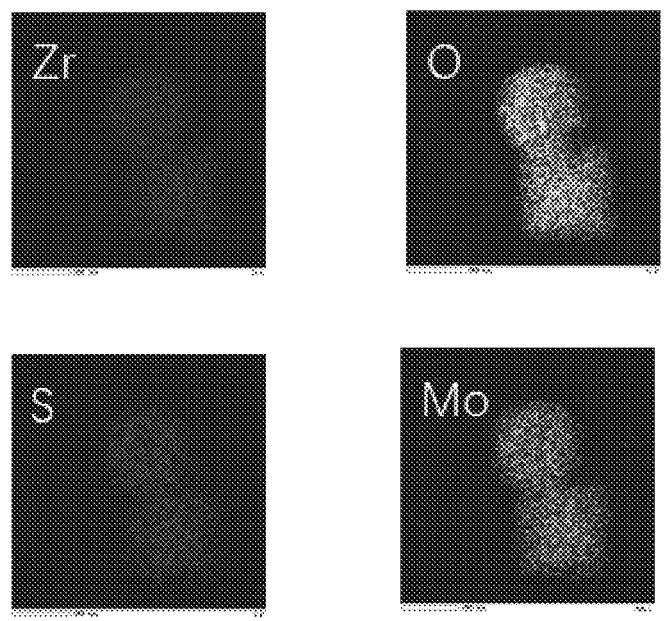
FIG. 1b shows a Mapping diagram of the UiO-66-Mo1 material in Embodiment 1.
Figure 2A:
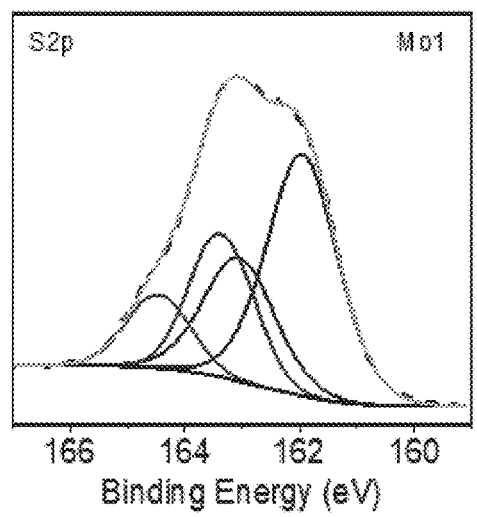
FIG. 2a shows an XPS diagram of an S2p orbit in ammonium tetrathiomolybdate in Embodiment 1.
Figure 2B:
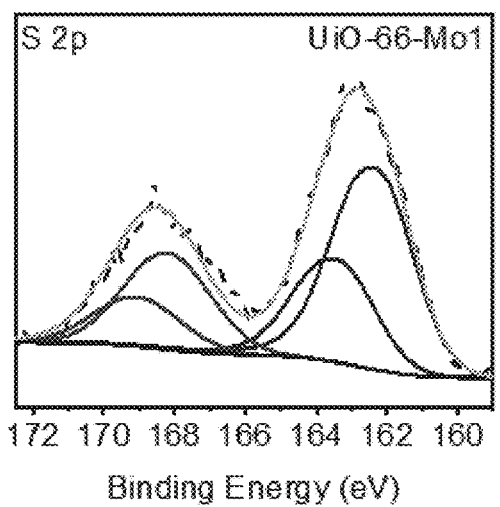
FIG. 2b shows an XPS diagram of an S2p orbit in the modified UiO-66-Mo1 material in Embodiment 1.
Figure 3A:
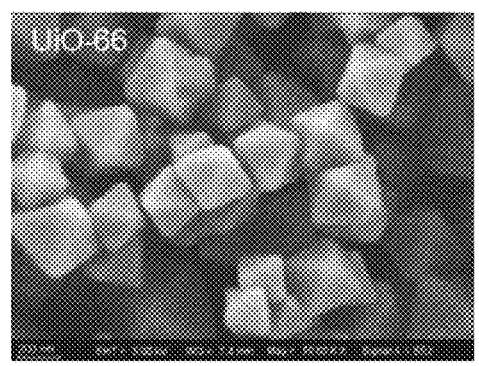
FIG. 3a shows an SEM image of a UiO-66 material in Embodiment 1.
Figure 3B:
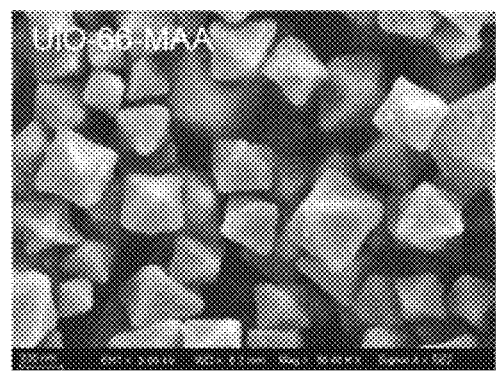
FIG. 3b shows an SEM image of the UiO-66-Mo1 material in Embodiment 1.
Figure 3C:
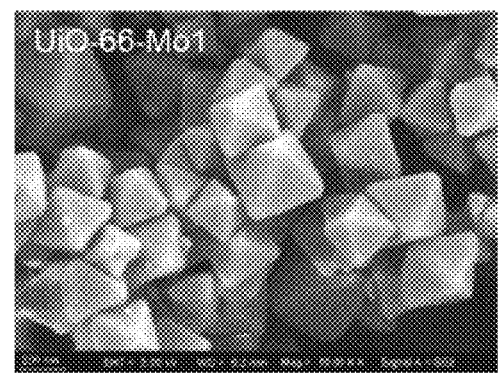
FIG. 3c shows an SEM image of a UiO-66 material in Comparative Example 1.
Figure 4:
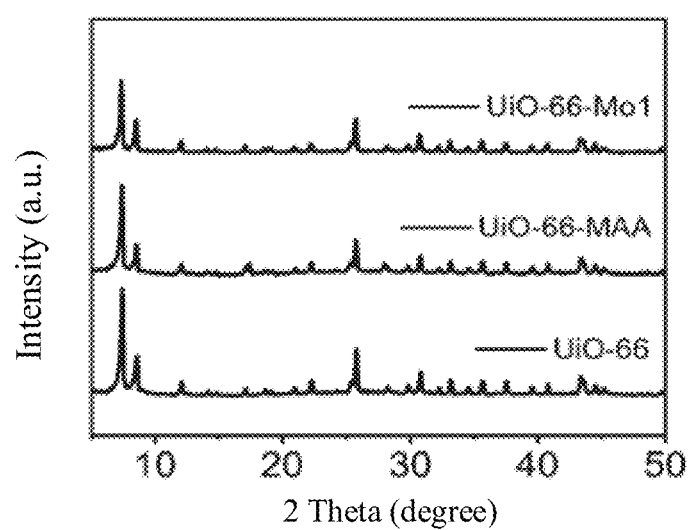
FIG. 4 shows XRD diagrams of the UiO-66-Mo1 material, the UiO-66-MAA material and the UiO-66 material in Embodiment 1 and Comparative Example 1.
Figure 5A:
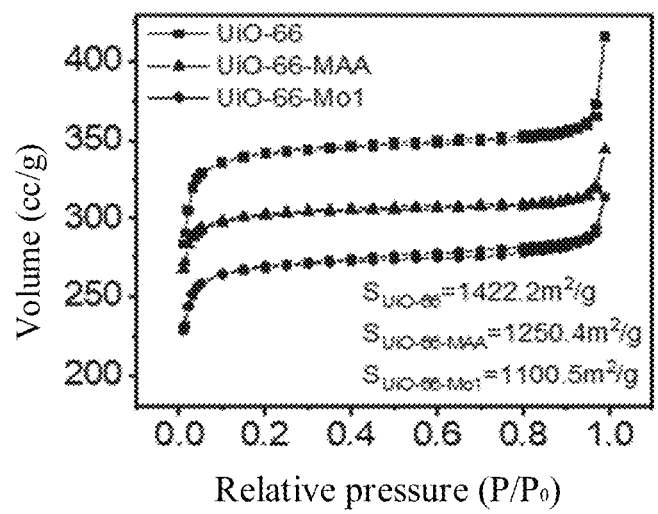
FIG. 5a shows a BET diagram of the UiO-66-Mo1 material, the UiO-66-MAA material and the UiO-66 material in Embodiment 1 and Comparative Example 1.
Figure 5B:
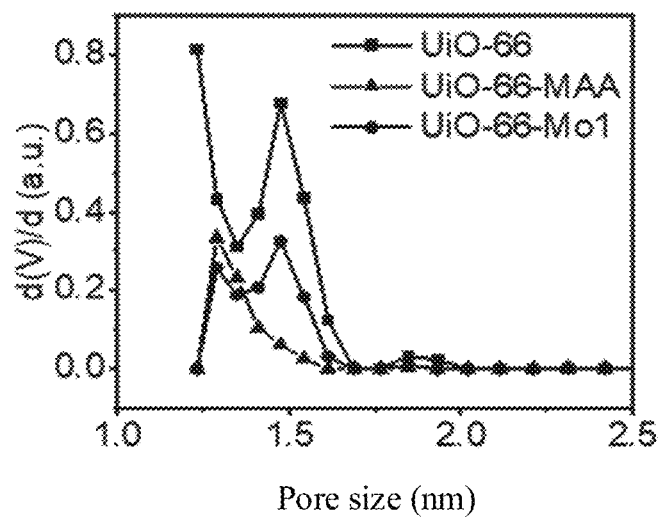
FIG. 5b shows a pore size distribution diagram of the UiO-66-Mo1 material, the UiO-66-MAA material and the UiO-66 material in Embodiment 1 and Comparative Example 1.

A transmission electron microscope (TEM) image of the UiO-66-Mo1 material was shown in FIG. 1a and FIG. 1b, and it could be seen from FIG. 1b that the ammonium tetrathiomolybdate was uniformly modified inside the UiO-66 material; XPS diagrams of S2p orbits in the ammonium tetrathiomolybdate and the modified UiO-66-Mo1 material were shown in FIG. 2a and FIG. 2b; and an SEM diagram, an XRD diagram and a BET diagram of the UiO-66-Mo1 material were shown in FIG. 3a, FIG. 3b, FIG. 3c, FIG. 4, FIG. 5a and FIG. 5b.

Comparative Example 1

A thioglycolic acid modified UiO-66 material was prepared as follows.
(1) Preparation of UiO-66: 0.2331 g of zirconium chloride (1 mmol) and 0.1661 g of terephthalic acid (1 mmol) were respectively dissolved in 10 mL of organic solvent N,N-dimethylformamide (DMF) at room temperature, then the solution was mixed and transferred into 50 mL of polytetrafluoroethylene reactor line, added with 2.86 mL (50 mmol) of acetic acid and 20 μL of deionized water, and mixed evenly, and then the reactor was transferred into an oven at 120° C. for reaction for 24 hours. After the reaction was finished, the reaction product was cooled to room temperature, and then subjected to ultrasonic cleaning twice with N,N-dimethylformamide, methanol and deionized water in sequence, and finally, the product was put into a freeze-dryer for freeze-drying at −50° C. for 24 hours, so as to obtain a UiO-66 raw material.

(2) 70 μL of thioglycolic acid was dissolved in 20 mL of deionized water, added with 100 mg of Uio-66 material, subjected to ultrasonic vibration, and then stirred by a magnetic force at room temperature for 8 hours, and then the mixed solution was transferred into an oven at 80° C. for reaction for 24 hours. The obtained sample was subjected to ultrasonic cleaning with deionized water for three times, and finally, the product was put into a freeze-drier for freeze-drying at −50° C. for 24 hours, so as to obtain the thioglycolic acid modified UiO-66 material, which was named as UiO-66-MAA.

In this case, different parameter conditions were explored when the UiO-66-MAA was prepared to ensure that the obtained UiO-66-MAA was obtained under optimal conditions, so that the obtained UiO-66-MAA had the best Hg(II) adsorption performance.

An SEM diagram, an XRD diagram and a BET diagram of the UiO-66-MAA material were shown in FIG. 3a, FIG. 3b, FIG. 3c, FIG. 4, FIG. 5a and FIG. 5b.

A certain amount of unmodified UiO-66 raw material was taken additionally, and an SEM diagram, an XRD diagram and a BET diagram of the raw material were shown in FIG. 3a, FIG. 3b, FIG. 3c, FIG. 4, FIG. 5a and FIG. 5b.

Embodiment 2

Certain amounts of unmodified UiO-66 raw material, UiO-66-Mo1 material prepared in Embodiment 1, and UiO-66-MAA material prepared in Comparative Example 1 were taken, and subjected to an Hg(II) solution adsorption performance test respectively.

A certain amount of UiO-66-Mo1 material prepared in Embodiment 1 was taken additionally to verify Hg(II) removal rates at different pH values.

Figure 6:
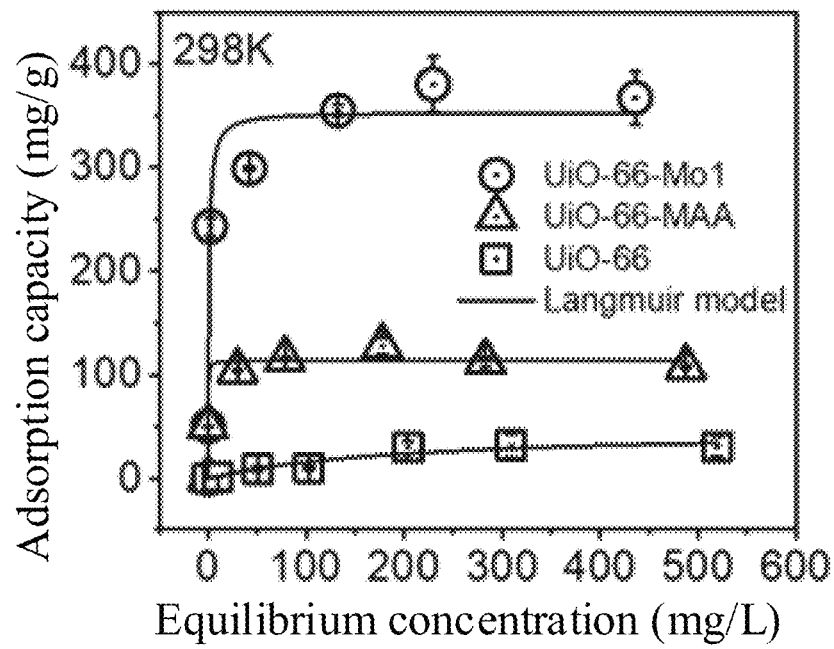
FIG. 6 shows a thermodynamic adsorption diagram of a UiO-66 material, a UiO-66-MAA material and a UiO-66-Mo1 material in Embodiment 2.
Figure 7:
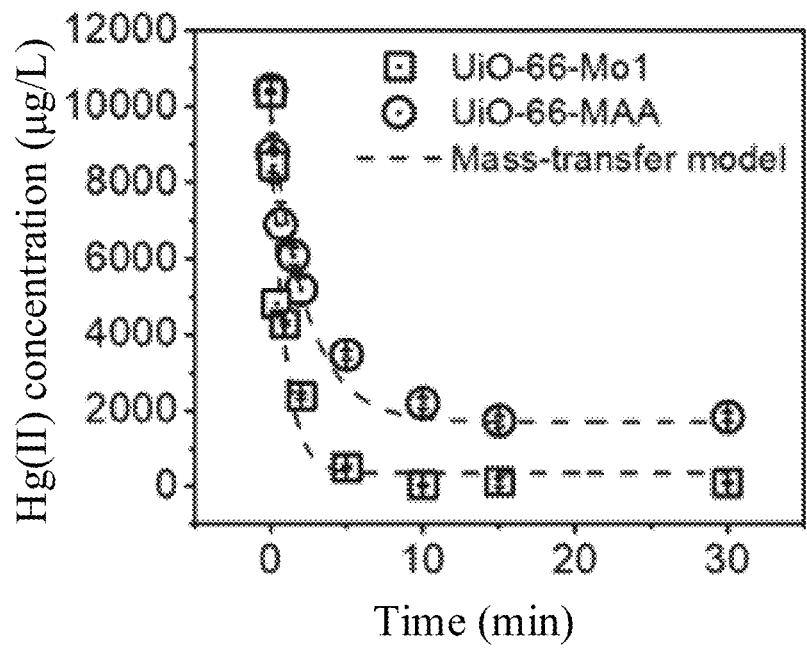
FIG. 7 shows a kinetic adsorption diagram of the UiO-66-MAA material and the UiO-66-Mo1 material in Embodiment 2.
Figure 8:
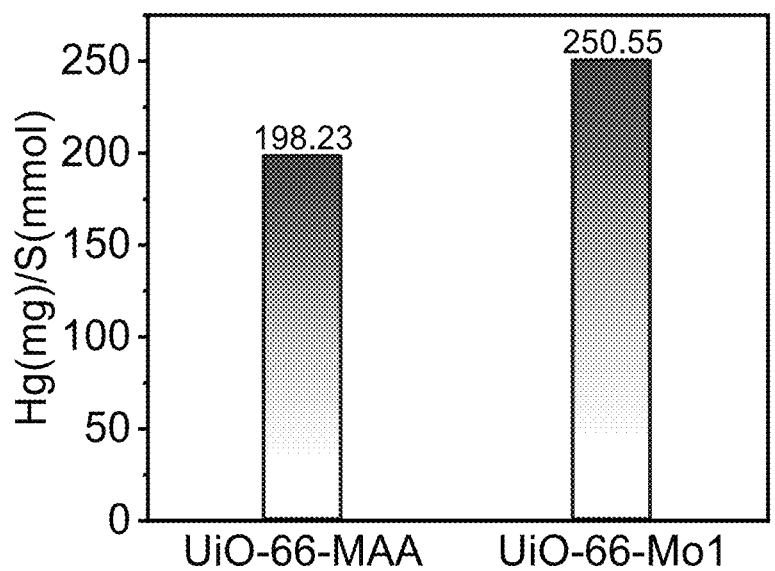
FIG. 8 shows S atom utilization rates of the UiO-66-MAA material and the UiO-66-Mo1 material in Embodiment 2.
Figure 9:
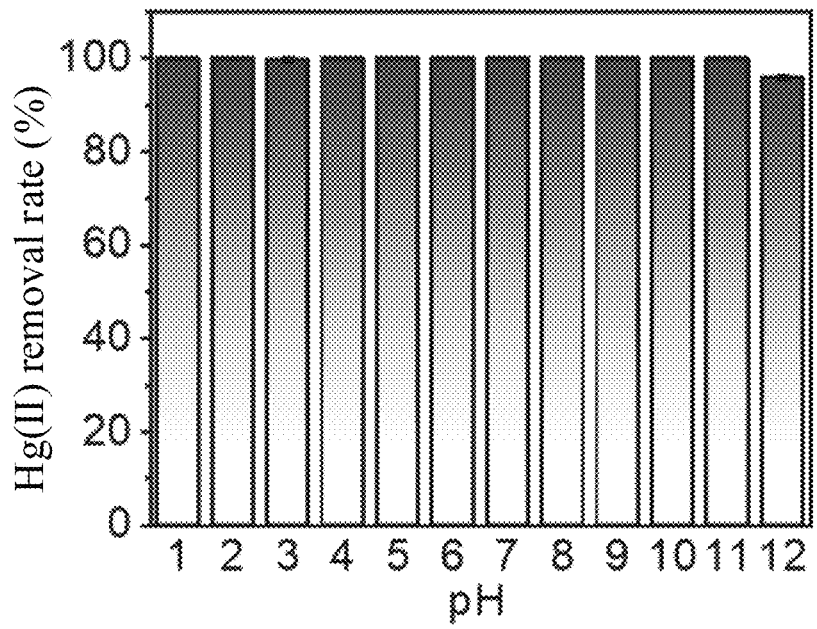
FIG. 9 shows deep Hg(II) removal rates of the UiO-66-Mo1 material at different pH values in Embodiment 2, wherein an initial concentration of Hg(II) is 10 ppm.

A thermodynamic adsorption diagram of the three materials was shown in FIG. 6; a kinetic adsorption diagram of the UiO-66-MAA material and the UiO-66-Mo1 material was shown in FIG. 7; S atom utilization rates of the UiO-66-MAA material and the UiO-66-Mo1 material were shown in FIG. 8; and deep Hg(II) removal rates of the UiO-66-Mo1 material at different pH values were shown in FIG. 9, wherein an initial concentration of Hg(II) was 10 ppm.

Results showed that: compared with the unmodified UiO-66 material, the UiO-66-MAA material and the UiO-66-Mo1 material both showed an improved adsorption performance, wherein compared with the UiO-66-MAA material, the UiO-66-Mo1 material showed a higher Hg(II) adsorption capacity and a higher Hg(II) adsorption rate; and moreover, an S atom utilization rate in the UiO-66-Mo1 material was higher than that in the UiO-66-MAA material. The UiO-66-Mo1 material showed excellent Hg(II) removal rates at different pH values.

Embodiment 3

An ammonium tetrathiomolybdate modified UiO-66 composite material had a specific preparation method as follows.
(1) Preparation of UiO-66: 0.2331 g of zirconium chloride (1 mmol) and 0.1661 g of terephthalic acid (1 mmol) were respectively dissolved in 10 mL of organic solvent N,N-dimethylformamide (DMF) at room temperature, then the solution was mixed and transferred into 50 mL of polytetrafluoroethylene reactor line, added with 2.86 mL (50 mmol) of acetic acid and 20 μL of deionized water, and mixed evenly, and then the reactor was transferred into an oven at 120° C. for reaction for 24 hours. After the reaction was finished, the reaction product was cooled to room temperature, and then subjected to ultrasonic cleaning twice with N,N-dimethylformamide, methanol and deionized water in sequence, and finally, the product was put into a freeze-dryer for freeze-drying at −50° C. for 24 hours, so as to obtain a UiO-66 raw material.

Different amounts (10 mg, 40 mg, 80 mg and 120 mg) of ammonium tetrathiomolybdate were dissolved in 20 mL of deionized water, added with 100 mg of Uio-66 material, subjected to ultrasonic vibration, and then stirred by a magnetic force at room temperature for 8 hours, and then the mixed solutions were transferred into an oven at 80° C. for reaction for 24 hours. The obtained samples were subjected to ultrasonic cleaning with deionized water for three times, and finally, the products were put into a freeze-drier for freeze-drying at −50° C. for 24 hours, so as to obtain the ammonium tetrathiomolybdate modified UiO-66 materials under different modification amounts.

Certain amounts of the ammonium tetrathiomolybdate modified UiO-66 materials prepared above and the ammonium tetrathiomolybdate modified UiO-66 material prepared from 20 mg of ammonium tetrathiomolybdate in Embodiment 1 were taken respectively, and subjected to an Hg(II) solution adsorption performance test; and BET, S atom contents and S atom utilization rates of the UiO-66-Mo1 materials prepared from the different amounts of ammonium tetrathiomolybdate above were determined. Results were shown in FIG. 10 to FIG. 13.

Figure 10:
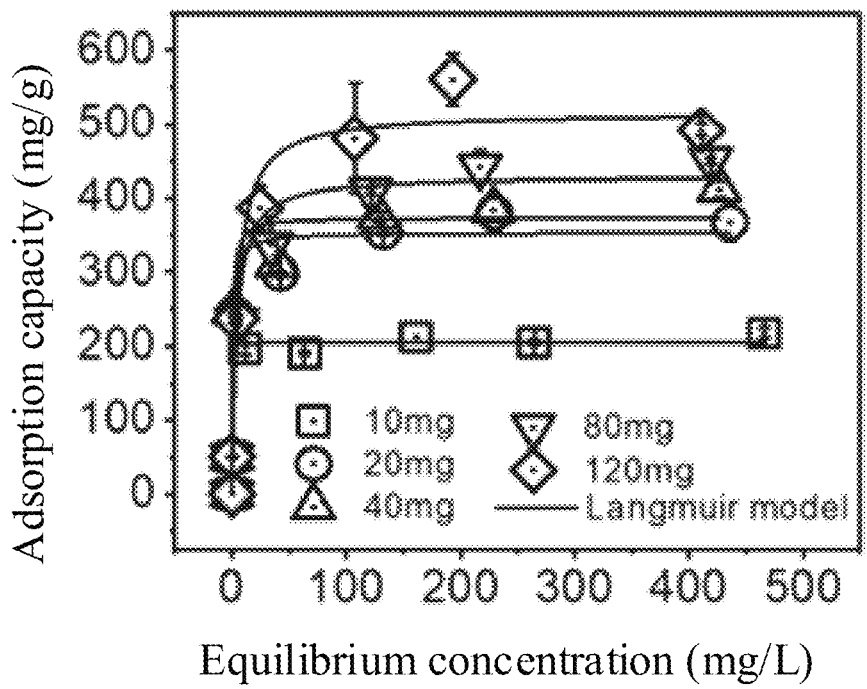
FIG. 10 shows a thermodynamic adsorption diagram of UiO-66-Mo1 in Embodiment 3 with different modification amounts.
Figure 11:
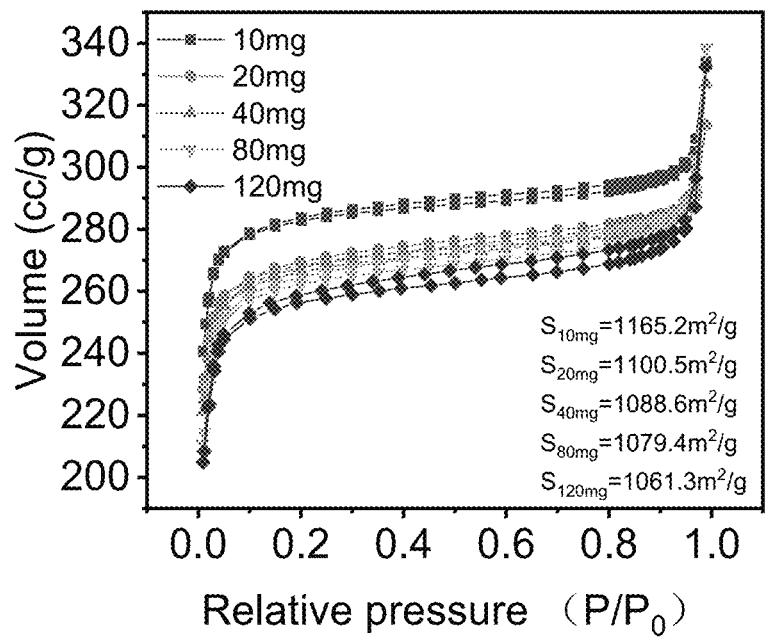
FIG. 11 shows a BET diagram of the UiO-66-Mo1 in Embodiment 3 with different modification amounts.
Figure 12:
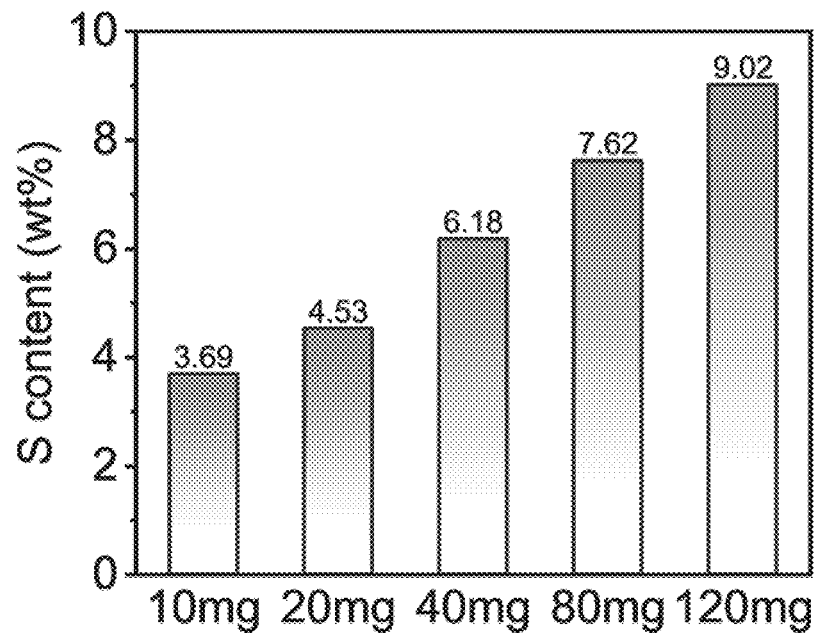
FIG. 12 shows S atom contents of the UiO-66-Mo1 in Embodiment 3 with different modification amounts.
Figure 13:
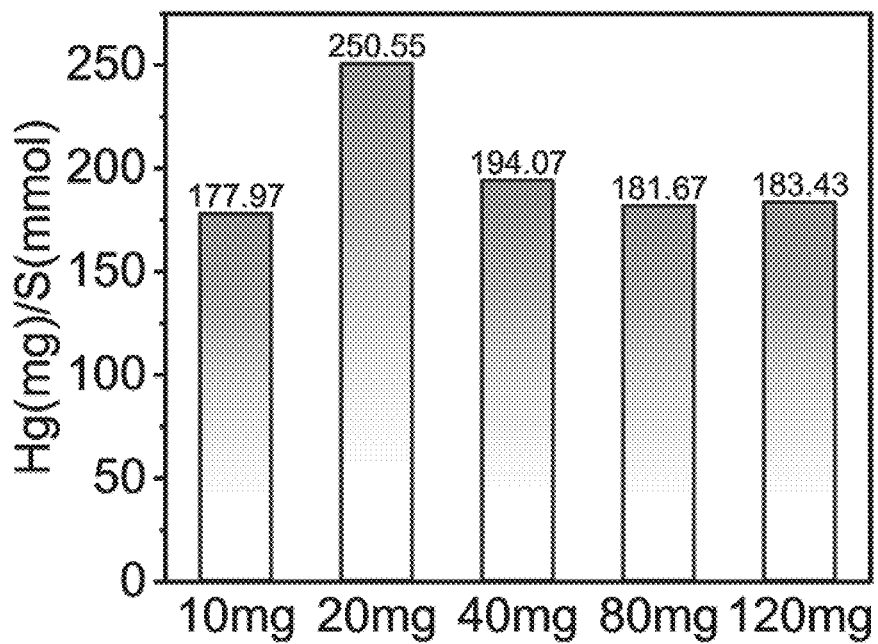
FIG. 13 shows S atom utilization rates of the UiO-66-Mo1 in Embodiment 3 with different modification amounts.

Results showed that: according to FIG. 10, an Hg(II) solution adsorption performance of the UiO-66-Mo1 material was positively correlated with the modification amount of ammonium tetrathiomolybdate, and a largest adsorption capacity was reached when 120 mg of ammonium tetrathiomolybdate was used; according to FIG. 11, a specific surface area of the UiO-66-Mo1 material was negatively correlated with the modification amount of ammonium tetrathiomolybdate, and a largest specific surface area of the material was reached when 10 mg of ammonium tetrathiomolybdate was used; according to FIG. 12, an S atom content in the UiO-66-Mo1 material was positively correlated with the modification amount of ammonium tetrathiomolybdate, and a largest S atom content in the material was reached when 120 mg of ammonium tetrathiomolybdate was used; and according to FIG. 13, as for an S atom utilization rate in the UiO-66-Mo1 material, a highest S atom utilization rate in the material was reached when 20 mg of ammonium tetrathiomolybdate was used.

Embodiment 4

An ammonium tetrathiomolybdate modified UiO-66 composite material had a specific preparation method as follows.
(1) Preparation of UiO-66: 0.2331 g of zirconium chloride (1 mmol) and 0.1661 g of terephthalic acid (1 mmol) were respectively dissolved in 10 mL of organic solvent N,N-dimethylformamide (DMF) at room temperature, then the solution was mixed and transferred into 50 mL of polytetrafluoroethylene reactor line, added with 2.86 mL (50 mmol) of acetic acid and 20 μL of deionized water, and mixed evenly, and then the reactor was transferred into an oven at 120° C. for reaction for 24 hours. After the reaction was finished, the reaction product was cooled to room temperature, and then subjected to ultrasonic cleaning twice with N,N-dimethylformamide, methanol and deionized water in sequence, and finally, the product was put into a freeze-dryer for freeze-drying at −50° C. for 24 hours, so as to obtain a UiO-66 raw material.

(2) 80 mg/120 mg of ammonium tetrathiomolybdate was dissolved in 20 mL of deionized water, added with 100 mg of Uio-66 material, subjected to ultrasonic vibration, and then stirred by a magnetic force at room temperature for 8 hours, and then the mixed solution was transferred into an oven at 120° C. for reaction for 24 hours. The obtained sample was subjected to ultrasonic cleaning with deionized water for three times, and finally, the product was put into a freeze-drier for freeze-drying at −50° C. for 24 hours, so as to obtain the ammonium tetrathiomolybdate modified UiO-66 material.

Figure 14:
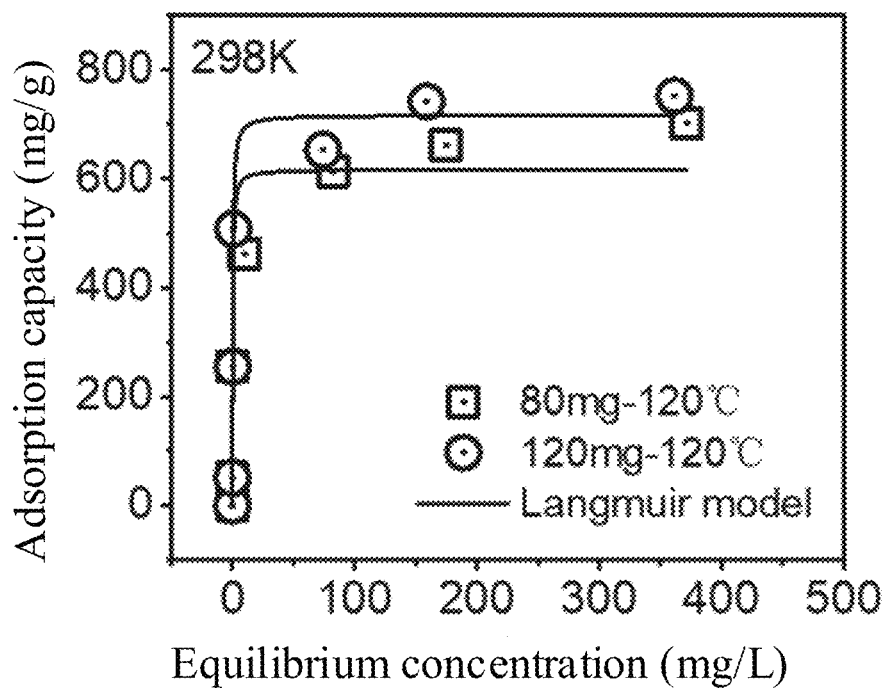
FIG. 14 shows a thermodynamic adsorption diagram of UiO-66-Mo1 in Embodiment 4 under modifications at different temperatures.

A certain amount of the ammonium tetrathiomolybdate modified UiO-66 material above and the modified UiO-66 material prepared from the same amount of ammonium tetrathiomolybdate in Embodiment 3 were taken respectively, and subjected to an Hg(II) solution adsorption performance test; and details were shown in FIG. 14.

Results showed that: by comparing FIG. 14 with FIG. 10 in Embodiment 3, under the same other conditions, with the increase of the reaction temperature in the oven in the step (2), whether the amount of ammonium tetrathiomolybdate is 80 mg or 120 mg, the ammonium tetrathiomolybdate modified UiO-66 material obtained was better than the ammonium tetrathiomolybdate modified UiO-66 material obtained at 80° C. in the Hg(II) adsorption performance to some extent.

Embodiment 5

Figure 15:
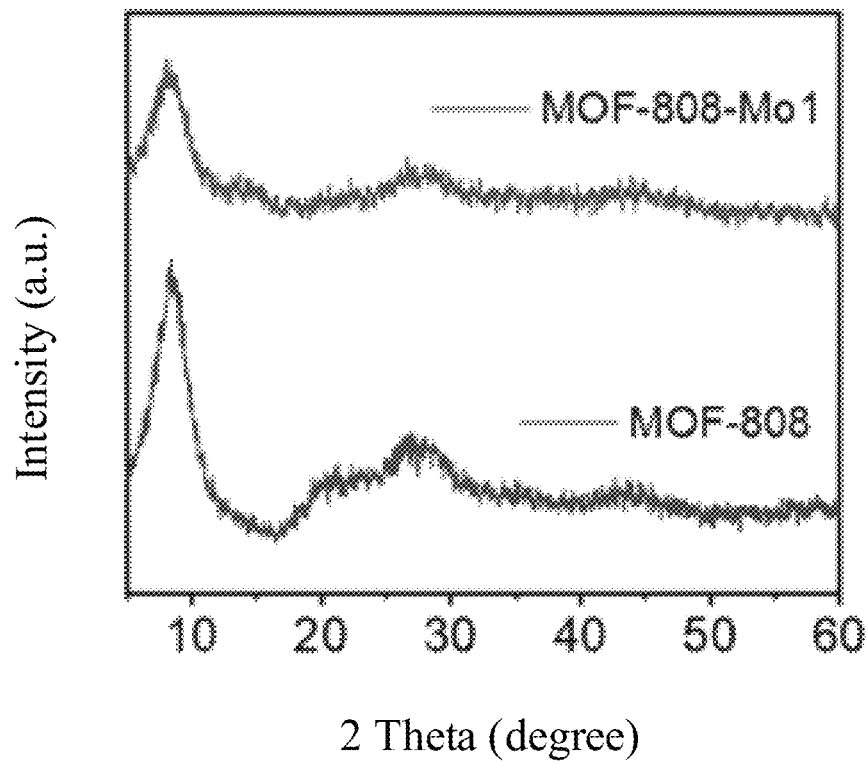
FIG. 15 shows an XRD diagram of an MOF-808 material in Embodiment 5 before and after modification.

An ammonium tetrathiomolybdate modified MOF-808 material had a specific preparation method as follows.
(1) Preparation of MOF-808: 0.1781 g of zirconium oxychloride (1 mmol) and 0.2101 g of trimesic acid (1 mmol) were respectively dissolved in 10 mL of organic solvent N,N-dimethylformamide (DMF) at room temperature, then the solution was mixed and transferred into 50 mL of polytetrafluoroethylene reactor line, added with 2.86 mL (50 mmol) of acetic acid and 20 μL of deionized water, and mixed evenly, and then the reactor was transferred into an oven at 140° C. for reaction for 24 hours. After the reaction was finished, the reaction product was cooled to room temperature, and then subjected to ultrasonic cleaning twice with N,N-dimethylformamide, methanol and deionized water in sequence, and finally, the product was put into a freeze-dryer for freeze-drying at −50° C. for 24 hours, so as to obtain an MOF-808 raw material.
(2) 20 mg of ammonium tetrathiomolybdate was dissolved in 20 mL of deionized water, added with 100 mg of MOF-808 material, subjected to ultrasonic vibration, and then stirred by a magnetic force at room temperature for 8 hours, and then the mixed solution was transferred into an oven at 80° C. for reaction for 24 hours. The obtained sample was subjected to ultrasonic cleaning with deionized water for three times, and finally, the product was put into a freeze-drier for freeze-drying at −50° C. for 24 hours, so as to obtain the ammonium tetrathiomolybdate modified MOF-808 material, which was named as MOF-808-Mo1. An XRD diagram of the material before and after modification was shown in FIG. 15.

Figure 16:
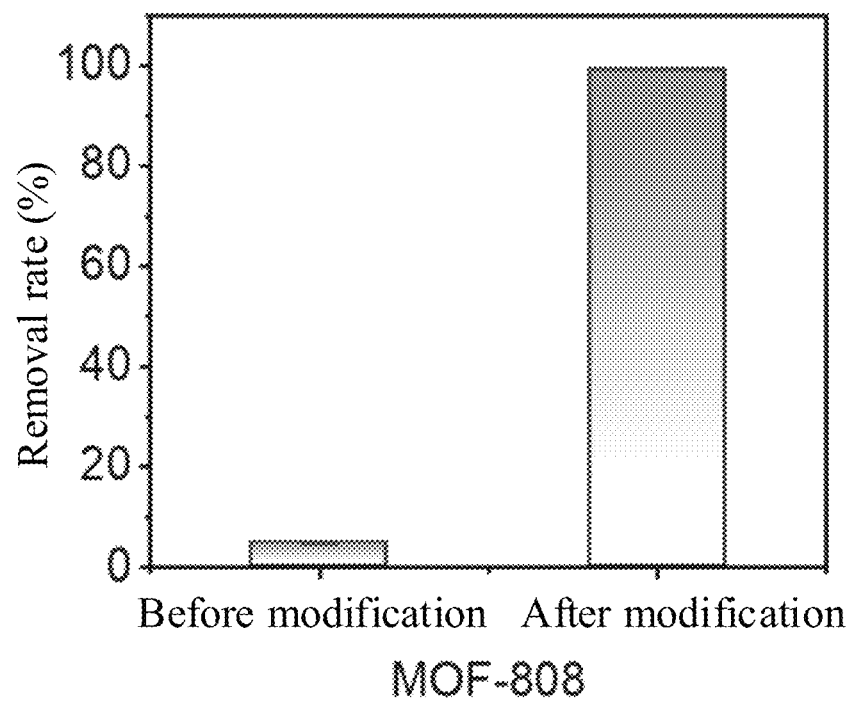
FIG. 16 shows an adsorption performance test diagram of the MOF-808 material in Embodiment 5 for an Hg(II) solution before and after modification.

A certain amount of the ammonium tetrathiomolybdate modified MOF-808 material above was taken, and subjected to an Hg(II) solution adsorption performance test. Results were shown in FIG. 16.

Results showed that: as for the removal of 100 ppm Hg(II) solution, the Hg(II) removal rate of the modified material was as high as 99%, which indicated that the ammonium tetrathiomolybdate modified MOF-808 material also had a good removal effect on the Hg(II), and in combination with the XRD diagram of the material before and after modification, it could be seen that the original pore structure inside the material was not changed, which met the requirement of not changing the original pore structure inside the material in the present invention.

Comparative Example 2

Figure 17:
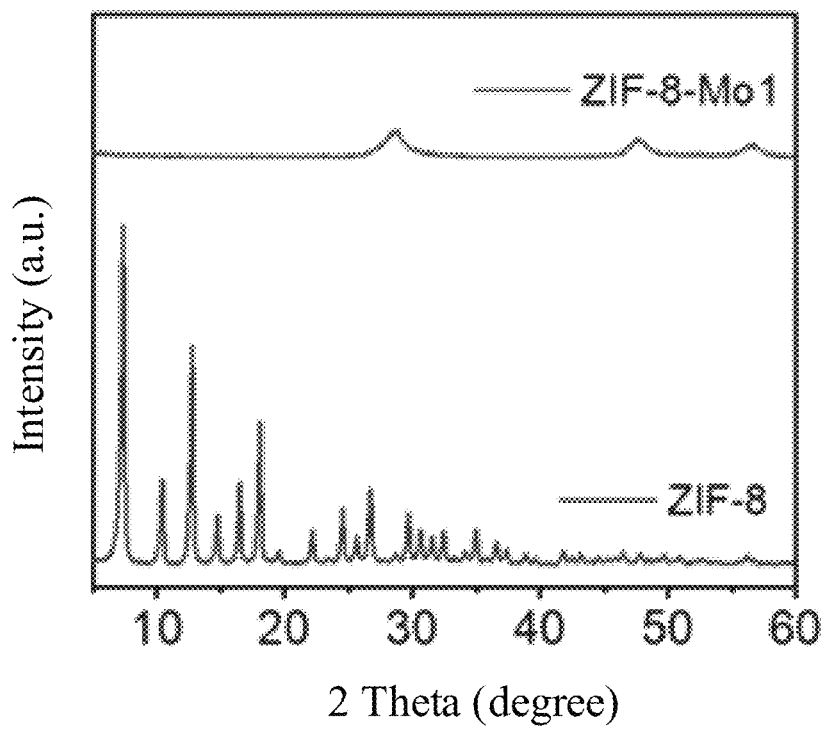
FIG. 17 shows an XRD diagram of a ZIF-8 material in Comparative Example 2 before and after modification.

An ammonium tetrathiomolybdate modified ZIF-8 material was prepared.
(1) Preparation of ZIF-8: at room temperature, 1.17 g of zinc nitrate hexahydrate was dissolved in 8 mL of deionized water and 22.70 g of 2-methylimidazole was dissolved in 80 mL of deionized water, and the zinc nitrate solution was added into the ligand solution under magnetic stirring to be mixed evenly and stirred for 1 hour. After the reaction was finished, the product was centrifugally collected, and then subjected to ultrasonic cleaning for three times with deionized water, and finally, the product was put into a freeze-dryer for freeze-drying for 24 hours, so as to obtain a ZIF-8 raw material.
(2) 20 mg of ammonium tetrathiomolybdate was dissolved in 20 mL of deionized water, added with 100 mg of ZIF-8 material, subjected to ultrasonic vibration, and then stirred by a magnetic force at room temperature for 8 hours, and then the mixed solution was transferred into an oven at 80° C. for reaction for 24 hours. The obtained sample was subjected to ultrasonic cleaning with deionized water for three times, and finally, the product was put into a freeze-drier for freeze-drying at −50° C. for 24 hours, so as to obtain the ammonium tetrathiomolybdate modified ZIF-8 material, which was named as ZIF-8-Mo1. An XRD diagram of the material before and after modification was shown in FIG. 17.

Figure 18:
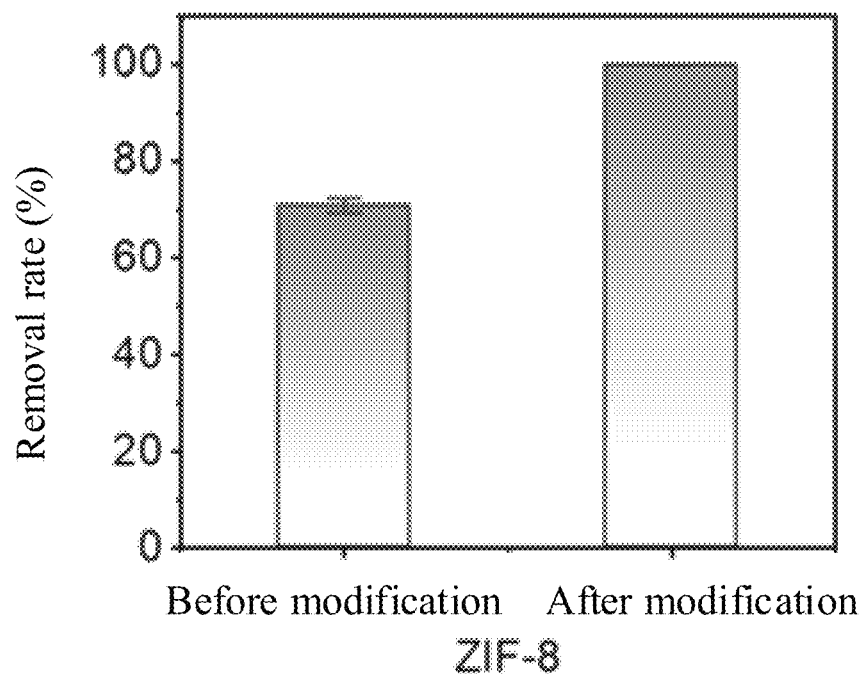
FIG. 18 shows an adsorption performance test diagram of the ZIF-8 material in Comparative Example 2 for the Hg(II) solution before and after modification.

A certain amount of the ammonium tetrathiomolybdate modified ZIF-8 material above was taken, and subjected to an Hg(II) solution adsorption performance test. Results were shown in FIG. 18.

Results showed that: as for the removal of 100 ppm Hg(II) solution, although the Hg(II) removal rate of the modified material was as high as 99%, in combination with the XRD diagram of the material before and after modification, it could be seen that the original pore structure inside the material was changed, which did not meet the requirement of not changing the original pore structure inside the material in the present invention.

Comparative Example 3

An ammonium tetrathiomolybdate modified HKUST-1 material was prepared.
(1) Preparation of HKUST-1: at room temperature, 0.35 g of copper nitrate trihydrate was dissolved in 7.5 mL of deionized water and 0.21 g of trimesic acid was dissolved in 7.5 mL of ethanol, and the above solutions were mixed evenly under magnetic stirring, transferred to a hydrothermal reactor after stirring, and then put into an oven at 100° C. for reaction for 20 hours. After the reaction was finished, the product was centrifugally collected, and then subjected to ultrasonic cleaning twice with ethanol and deionized water respectively, and finally, the product was put into a freeze-dryer for freeze-drying for 24 hours, so as to obtain an HKUST-1 raw material.

Figure 19:
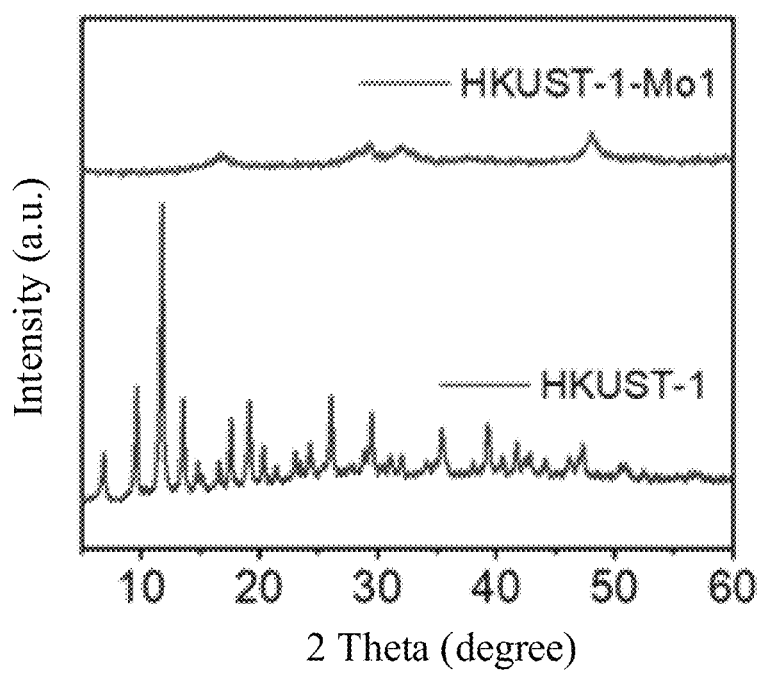
FIG. 19 shows an XRD diagram of an HKUST-1 material in Comparative Example 3 before and after modification.

(2) 20 mg of ammonium tetrathiomolybdate was dissolved in 20 mL of deionized water, added with 100 mg of HKUST-1 material, subjected to ultrasonic vibration, and then stirred by a magnetic force at room temperature for 8 hours, and then the mixed solution was transferred into an oven at 80° C. for reaction for 24 hours. The obtained sample was subjected to ultrasonic cleaning with deionized water for three times, and finally, the product was put into a freeze-drier for freeze-drying at −50° C. for 24 hours, so as to obtain the ammonium tetrathiomolybdate modified HKUST-1 material, which was named as HKUST-1-Mo1. An XRD diagram of the material before and after modification was shown in FIG. 19.

Figure 20:
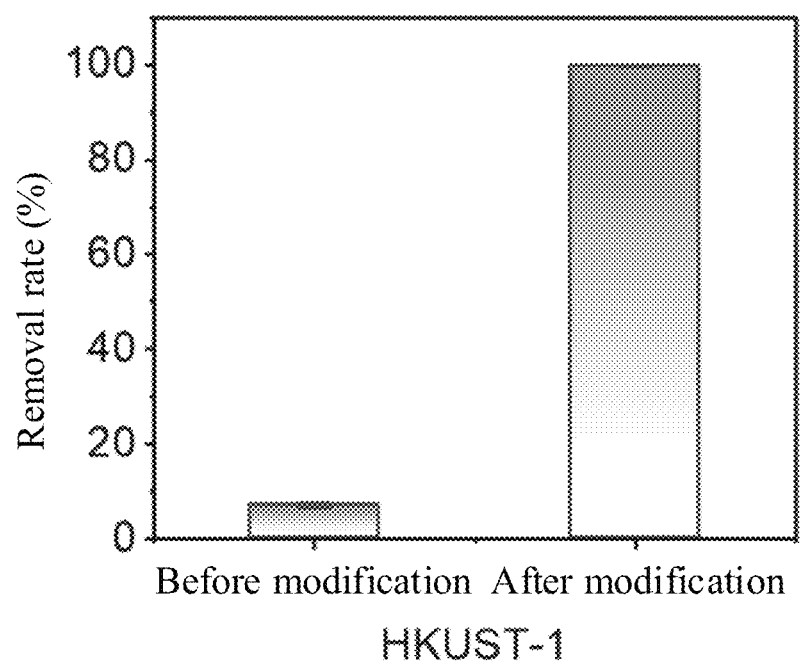
FIG. 20 shows an adsorption performance test diagram of the HKUST-1 material in Comparative Example 3 for the Hg(II) solution before and after modification.

A certain amount of the ammonium tetrathiomolybdate modified HKUST-1 material above was taken, and subjected to an Hg(II) solution adsorption performance test. Results were shown in FIG. 20.

Results showed that: as for the removal of 100 ppm Hg(II) solution, although the Hg(II) removal rate of the modified material was as high as 99%, in combination with the XRD diagram of the material before and after modification, it could be seen that the original pore structure inside the material was changed, which did not meet the requirement of not changing the original pore structure inside the material in the present invention.

We claim:

1. An application of a sulfur-molybdenum cluster modified metal organic framework (MOF) composite material in removing Hg(II) in mercury contaminated water, wherein an MOF material is taken as a metal organic framework, and ammonium tetrathiomolybdate is modified inside the metal organic framework; according to a mass percentage of the sulfur-molybdenum cluster modified MOF composite material, the MOF material accounts for 45 wt % to 90 wt %, and a modification amount of the ammonium tetrathiomolybdate accounts for 10 wt % to 55 wt %; and the MOF material is UiO-66 or MOF-808; and a preparation method of the sulfur-molybdenum cluster modified MOF composite material comprises the following steps of: adding the MOF material into an ammonium tetrathiomolybdate aqueous solution, and mixing and stirring the mixture to obtain a mixed solution; and allowing the mixed solution to react at 80° C. to 120° C. for 2 hours to 24 hours, and washing and drying the obtained product to prepare the ammonium tetrathiomolybdate modified MOF composite material.

2. The application according to claim 1, wherein the ammonium tetrathiomolybdate is modified on a Zr metal center inside the MOF material in a form of an anion $MoS_4^{2-}$ cluster.

3. The application according to claim 1, wherein, in the mixed solution, a concentration of the ammonium tetrathiomolybdate aqueous solution is 0.5 g/L to 6 g/L; and a ratio of the MOF material to the ammonium tetrathiomolybdate aqueous solution is 1 g:0.11 g/L to 1.2 g/L.

4. The application according to claim 1, wherein the mixing and stirring lasts for 6 hours to 18 hours.

5. The application according to claim 1, wherein the drying refers to freeze-drying, and the freeze-drying is carried out at −60° C. to −40° C., and lasts for 18 hours to 36 hours.

\* \* \* \* \*